United States Patent
Jaques et al.

(10) Patent No.: US 10,876,951 B2
(45) Date of Patent: Dec. 29, 2020

(54) SELF-LEARNING FILTER LIFETIME ESTIMATION METHOD

(71) Applicant: Agie Charmilles SA, Losone (CH)

(72) Inventors: Fabrice Jaques, Satigny (CH);
Roberto Perez, Geneva (CH);
Bertrand Lavazais, Thoiry (FR);
Thomas Serra Tosio, Laverno (IT)

(73) Assignee: Agie Charmilles SA

( * ) Notice: Subject to any disclaimer, the term of this patent is extended or adjusted under 35 U.S.C. 154(b) by 357 days.

(21) Appl. No.: 15/920,868

(22) Filed: Mar. 14, 2018

(65) Prior Publication Data
US 2018/0266935 A1    Sep. 20, 2018

(30) Foreign Application Priority Data
Mar. 15, 2017    (EP) .................................... 17161077

(51) Int. Cl.
*G01N 15/08*    (2006.01)
*B23H 1/10*    (2006.01)
(Continued)

(52) U.S. Cl.
CPC ....... *G01N 15/0806* (2013.01); *B01D 29/606* (2013.01); *B01D 35/143* (2013.01);
(Continued)

(58) Field of Classification Search
CPC .............. G01N 15/08; G01N 15/0806; G01N 2015/084; B23H 1/10; B23H 7/36;
(Continued)

(56) References Cited

U.S. PATENT DOCUMENTS 10,179,368 B2*    1/2019    Nishikawa .............. C02F 1/008
2002/0134759 A1    9/2002    Kita et al.
(Continued)

FOREIGN PATENT DOCUMENTS

EP    3009218 A1    4/2016

OTHER PUBLICATIONS

Extended European Search Report for Application No. 17161077.7 dated Sep. 5, 2017 (9 pages).

*Primary Examiner* — Joseph W Drodge
(74) *Attorney, Agent, or Firm* — Harness, Dickey & Pierce, P.L.C.

(57) ABSTRACT

A method for the determination of lifetime of a filter of an electric discharge machine the electrical discharge machine in consideration of a maximum allowable filter pressure, wherein the time measuring unit counts the machining time ts during which an electric discharge machining process is running, a filter pressure sensor measures the filter pressure p(k), preferably with a predetermined sampling interval, the pressure measurement p(k) and the respective sampling time t(k) are stored, and the sampled measurements p(k) and the respective sampling times t(k) are used to determine the parameters of an exponential function which best fits to the plurality of sampled measurements regression analysis. The determined parameters include the filter lifetime tf, which serves to determine the residual time to the filter replacement tr and/or the calendar deadline of filter expiration.

15 Claims, 3 Drawing Sheets

(51) Int. Cl.
   *B23H 7/02* (2006.01)
   *B23H 7/20* (2006.01)
   *B01D 29/60* (2006.01)
   *B01D 35/143* (2006.01)
   *B23H 7/36* (2006.01)

(52) U.S. Cl.
   CPC ............... *B23H 1/10* (2013.01); *B23H 7/02* (2013.01); *B23H 7/36* (2013.01); *B23H 7/20* (2013.01); *G01N 2015/084* (2013.01)

(58) Field of Classification Search
   CPC ... B23H 7/02; B23H 7/20; B23H 5/12; B23H 5/14; B01D 29/60; B01D 29/606; B01D 33/804; B01D 33/808; B01D 35/14; B01D 35/143; B01D 2201/14; B01D 2201/52; B01D 2201/54; C02F 1/004; C02F 1/008; C02F 2209/03; C02F 2209/44; C02F 2209/445
   USPC .............. 219/69.14; 451/36, 60, 446; 73/38; 210/85, 90, 91, 741; 96/421; 95/19
   See application file for complete search history.

(56) References Cited

U.S. PATENT DOCUMENTS

| | | | |
|---|---|---|---|
| 2004/0017289 A1* | 1/2004 | Brown, Jr. | B60C 23/0408 340/442 |
| 2004/0238417 A1 | 12/2004 | Arakawa et al. | |
| 2006/0259273 A1* | 11/2006 | Goldberg | B01D 37/046 702/182 |
| 2011/0307160 A1 | 12/2011 | Verdegan et al. | |
| 2015/0202701 A1 | 7/2015 | Hara | |
| 2016/0046503 A1* | 2/2016 | Hoek | C02F 1/004 210/636 |
| 2016/0096231 A1 | 4/2016 | Nishikawa et al. | |
| 2016/0320257 A1* | 11/2016 | Oakes | G01L 23/24 |
| 2017/0050130 A1* | 2/2017 | Bippus | F25D 23/126 |
| 2017/0211498 A1* | 7/2017 | Moore | F02M 35/1038 |

* cited by examiner

Calendar deadline

SELF-LEARNING FILTER LIFETIME ESTIMATION METHOD

CROSS-REFERENCE TO RELATED APPLICATIONS

This application claims the benefit and priority of European Patent Application No. 17 161 077.7 filed Mar. 15, 2017. The entire disclosure of the above application is incorporated hereby reference in its entirety.

FIELD

The invention relates generally to a method for the determination of the time during which the EDM machine can be operated before dielectric filters are to be replaced.

BACKGROUND

In an EDM machine (EDM: Electrical Discharge Machining), a dielectric fluid is used to cool, insulate, ionize and clean the gap. The EDM process produces small particles of removed material. These debris are moved away from the work tank by a dielectric fluid circulation, and are collected in dielectric unit of the EDM machine, the dielectric unit comprising a filtering circuit, to provide a clean dielectric fluid to the work tank and to the flushing nozzles. In general the filtering circuit of an EDM machine comprises one or more filter cartridges. Filters have a 1 to 25 micron rating, typically 3 to 1 micron. The overall filter service life is in the range of several hundred machining hours. Said initially empty cartridges (containing no debris), retain more and more of said removed material particles, as long as the time elapses. Filter cartridges are consumables; they have to be replaced at the latest when they are occluded to such an extent that the filter input pressure reaches the maximum allowable filter pressure. The maximum permissible operating pressure drop over the filter is indicated by the manufacturer of the filters, and is in the range of 2 to 2.8 bar (200-280 kPa). If the maximum allowable filter pressure is exceeded the filter could break, or may not deliver enough cleaned dielectric at its output. Thus a monitoring system is used to check the state of the filter, and at least indicate when machining is not possible any longer. The filter circuit of an electrical discharge machine is generally equipped with a pressure sensor, i.e. a pressure transducer providing a voltage proportional to the pressure, or at least a pressure gauge having a scale to indicate the filter pressure, the sectors of the scale being sometimes marked with different colors for visual control, for instance using red color in the pressure range where the filter has to be replaced. The pressure transducer is connected with the control unit so that the filter pressure value is constantly monitored and displayable on the human machine interface (HMI).

Further it is known to load/reset a down-counter at a defined value when replacing the used filters with new filters, and to decrement the counter when filter is in use, as long as the time elapses.

Patent application EP 3 009 218 A1 discloses a wire electrical discharge machine having an estimation function to estimate the point in time for the filter replacement. This method uses factor tables that take into account the machining conditions, that is a number of parameters which determine the deterioration of the filter due to its progressive obstruction, and looking ahead to determine the remaining available filter lifetime. The current fluid pressure in the filter is measured by a pressure sensor in known manner. The method is based on the current filter pressure as well as the difference in pressure at a given time, without any other form of historical data. This involves knowing in advance the clogging of the filters for a particular filter, as a function of various parameters, such as machining parameters, machined material, etc. and constituting a database including coefficients for the fluid pressure variation amount per unit time for each considered combination. Such data collection require significant characterization work by the EDM machine manufacturer.

The actual machining conditions are determined mainly by:
  Filter type: Filters are available with different volumes, filtering surfaces, and maximum allowable pressure.
  Material of the machined part.
  Material of the electrode-tool used to machine the part.
  Machining parameters (regimes for roughing, finishing, etc.)
  Relation of machine operation time over pause time
  Size and concentration of filtered particles (mainly determined by above mentioned parameters)

Summarizing, the drawbacks of these methods are:
  The need to construct a database considering a variety of materials, various machining regimes, filter types and characteristics, etc. It is to be noted that sometimes the composition of the work piece is known only to the customer. The work piece material may be a special alloy which is not revealed to the EDM machines manufacturer;
  The need to know some physical constants related to the filter, to the particles, to the dielectric, and so on.

It is an aspect of the invention to provide a simple, universal and reliable method to predict the filter lifetime and/or the residual time to filter replacement and/or the calendar deadline for the replacement of the filters, and an electrical discharge machine implementing the method.

This aspect of the present invention is solved by a method for the determination of the lifetime of a filter of an electrical discharge machine wherein a maximum allowable filter pressure pmax is stored, and wherein a machining time measuring unit counts the time is during which an electrical discharge machining process is running, and wherein during the machining time a filter pressure p(k) is repeatedly measured by means of a filter pressure sensor at sampling times t(k), and wherein with a predetermined sampling interval, the filter pressure measurements p(k) and the respective sampling time t(k) are stored, and wherein the parameters of an exponential function, being the time constant Tau and filter lifetime tf, which best fits to the plurality of sampled measurements p(k), t(k) are determined by regression analysis.

Thus the filter lifetime tf can be continuously determined by repeatedly measuring the filter pressure p(k) at sampling times t(k).

An aspect of the present invention is achieved by an electrical discharge machine comprising a control unit, the control unit comprising a machining time measuring unit and a memory unit, the electrical discharge machine further comprising a dielectric unit for the conditioning of a dielectric fluid, the dielectric unit comprising a filtration circuit with one or more filters to filter the debris produced by the electrical discharge machining process, the filtration circuit further comprising a filter pressure sensor located in the filtration circuit through which the machining fluid is supplied to the filter and configured to measure a filter pressure, whereas the machining time measuring unit which counts the time where the electric discharge machining process is producing debris, the filter pressure sensor is configured to measure the filter pressure during the machining time, the control unit is configured to sample the filter pressure by said filter pressure sensor, the memory unit is configured to store the current machining time determined by the machining time measuring unit and the current filter pressure determined by the filter pressure sensor, the control unit is configured to calculate a filter lifetime based on the stored machining times and filter pressure values and a maximum allowable filter pressure pmax, and a display unit is configured to display the calculated filter lifetime.

The preferred embodiment of the invention refers to a new method to predict the filter lifetime, which is generally determined by the maximum filter pressure. The filter lifetime is also defined as the time at which the filter is expected to reach the end of life. The expected filter lifetime is computed based on the measurement of at least one significant physical value over the time, that is, based on the logged historical values (look-behind) of said significant physical value. Here a significant physical value is a value being somehow proportional to the filter occlusion, for instance the filter pressure or the flow rate though the filter. The significant physical value is continuously or periodically determined in time, that is measured and stored, so as to provide a filter pressure history. For instance the physical value is continuously measured and monitored, and periodically stored with a certain sampling interval to get a number of measuring points over time. The filter history is defined as the entirety or part (a time window) or derived values of the measured physical values. The currently expected filter lifetime is referred to the machining time, that is when debris are produced, from the filter replacement (t=0) to its exhaustion. The filter lifetime is preferably newly computed with every latest pressure measurement, and preferably such that the best fitting exponential function matches exactly with the very latest pressure sampling.

Preferably, the invention further determines the residual time to filter replacement (also: residual filter lifetime, tr) which is defined as the time between the current machining time ts and the afore mentioned filter lifetime tf. In other words, the residual time to filter replacement tr is computed by subtracting the current machining time ts from the calculated filter lifetime tf.

According an aspect of the invention the history of the measured physical values is used to determine the currently expected filter lifetime, and further a residual time to filter replacement. The residual time to filter replacement is referred to the time between the current machining time and the afore mentioned currently expected filter lifetime, that is the time left to the filter replacement.

The preferred embodiment of the invention further determines the calendar deadline, that is the date and time at which the filter pressure is expected to reach the maximum allowable pressure, the filter lifetime is reached and filters must be replaced. The calendar deadline is computed for instance by adding the above mentioned residual time to filter replacement tr to the current calendar date and time.

Alternatively the calendar deadline is determined in an absolute timescale. Here an initial calendar date and time tf_a0 at replacement of the filter is stored, and a time constant Tau_a and a calendar filter lifetime tf_a are computed by regression analysis of a number of samplings p(k), ta(k); note that the time constant Tau_a and a calendar filter lifetime tf_a are expressed in seconds. Lastly the calendar deadline, that is the date and time at which the filters will have to be replaced is computed by adding the calendar filter lifetime tf_a to the initial calendar date and time tf_a0.

According to this alternative method, when using the calendar date and time the machining pauses and stops are included, that is the computation of the calendar filter lifetime tf_a in the calendar timescale is simply based on the samplings of p(k) at respective ta(k), including machining stops. It is to be noted that this calendar filter lifetime tf_a is not identical to a filter lifetime tf which is computed considering only the effective machining time ts. Basically the same filter lifetime determination algorithm used for the computation of the filter lifetime tf can be used to determine the calendar filter lifetime tf_a.

The inventive method allows an estimation of the entire filter lifetime, residual filter lifetime, and calendar deadline, for any electrical discharge machine and any material (for example a material composition which is not disclosed by the machine customer), assuming a more or less repetitive use of the machine.

Hence there is no need to know the current machining conditions and parameter settings, such as generator parameters (regime), electrode material, part material and the like. In contrast to the known method, the inventive method does not require any test series to be executed beforehand nor a data table; only a few constants suffice. These are mainly the time window Tw determining the observation period considered for the sampling of the physical values, the sampling interval between two measurements t(k+1)−t(k) considering only the machining time, the initial filter pressure pa in the filter circuit when new filters are inserted, a transition pressure threshold pc and the maximum permissible filter pressure pmax, which is specified by the filter manufacturer. In case of use of a flow rate sensor, the minimum flow rate to be used as threshold for the determination of the end of filter life is to be specified.

Experience shows that when the filter is new, its filtering resistance and the observable variation thereof is very low. This is because the fiber constituting the filter are arranged, in some places in a tight manner, and in some other places in a more loosely manner, and small particles as well as fluid can easily pass through the pores, so that at this stage the measurable pressure is nearly constant. The pressure measured at the initial stage of the filter life is nearly constant, whereas afterwards the filter pressure increases exponentially. Over the time the particles, especially large ones cover the pores of the filter which becomes progressively more resistant to fluid flow. The transition between the two situations can be sometimes fast enough to make divergent time predictions if only based on current pressure. In addition to this, the filtration pumps can be stopped for various reasons: power economy or breakdown, etc. As soon as the filtration pumps are stopped, certain particles detach from the folds of the filter and slowly drop on the bottom of the filter, partially releasing the filter.

This impacts the filter pressure determined when the filtration pump is restarted, making lifetime estimation difficult, because the pressure measurement made immediately after a restart is much lower than it would be in a continuous circulation through the filter. After restart, it may take comparably long time to get the full filter pressure again, for instance an hour.

In a preferred embodiment the filter pressure is not measured immediately once the filtration pump is restarted or measurements made immediately after the restart are not considered. The delay of from restart to first measurement after restart may be a predefined value, for instance one hour.

As said, at the beginning of the life of the filter, the filter pressure is not significantly related to its soiling since pressure is nearly constant. At this stage the deterioration of the filter is thus not reliably detectable based on progress of the filter pressure. The inventive method circumvents this problem by using a predefined value of the overall filter lifetime tfo during this first period after a filter replacement (Zone "A"). Here the stored filter lifetime tf is set to the predefined overall lifetime value tfo after filter replacement; in this first period (Zone "A") the residual filter lifetime is computed by down-counting, as known in the art. Said predefined overall lifetime tfo may be a default lifetime or configured by the user or determined in consideration of the filter lifetime achieved with the latest filter cartridges or an average lifetime achieved with earlier filter cartridges, for instance 500 h.

The switch from the first period (Zone "A") to the second period (Zone "B") is done when the filter pressure reaches a predefined transition pressure threshold pc, for example 0.5 bar (50 kPa). Summarizing, after filter replacement the filter lifetime is determined by the predefined value of the overall filter lifetime tfo, and the residual time to filter replacement is computed by using the down-counting method, until the filter pressure reaches the predefined transition pressure threshold pc, then the filter lifetime is computed by regression analysis based on the logged pressures, and is updated after every new sampling. Thus the inventive method includes a two staged computation of filter lifetime, by which the reliability and stability of the prediction is improved.

The inventive method is robust, since an incorrect configuration has little effect on the accuracy of the estimation. The incorrect configuration may be for instance, an erroneous specification of the overall filter lifetime, or an unsuitable value of the transition pressure threshold, or an inappropriate sampling interval. In any case configuration values may be subject to a plausibility check. The inventive method is also robust in case of use of consumables having different quality than OEM (Original Equipment Manufacturer) products, not affecting the accuracy of the estimation. In fact the filter pressure is continuously or periodically measured and stored, so that the historical filter pressure data grows, and the control unit is able to properly estimate the current lifetime of the filter. Proper smoothing of the recorded filter pressure data reduces the variability of the estimated filter lifetime. The closer the filter is to its end-of-life, the more precise the estimate becomes, until it falls exactly on the actual lifetime.

The user of the machine is continuously informed about the expected filter lifetime tf, for instance the total number of machining hours which are expectable with the current filter, counted from the first machining with a new filter, where the machining time was ts=0. Likewise the user is continuously informed about the residual time to filter replacement tr, that is how long the filters will last, counted from the current time, for instance the number of machining hours left during which the EDM machine can be operated with the current filter. Of course any other format is possible, such as days and hours, etc. Likewise the user can choose to be continuously informed about the calendar deadline, that is the estimated date and time when the filters are to be replaced.

The user is informed by means of the display which is connected to the control unit. Further the control unit communicates the residual filter lifetime or the calendar deadline to the user via a network, for instance by sending punctual messages to a personal device of the user.

According to a preferred embodiment the filter lifetime, the remaining filter time and the calendar deadline are determined by the control unit and displayed on the display unit.

The user can set the preferred output values and output format in the configuration. At his discretion the user can set one or more triggers to get an early warning about the imminent exhaustion of filters. For instance he can choose to be warned 12 hours ahead of the estimated end of life of the filters.

According to a further embodiment the control unit of each electrical discharge machine implementing the invention communicates the residual time to filter replacement tr to a warehouse management system, so that new filters are allocated in due time, before end of filter life. Also, an order is automatically triggered when the available quantity falls below a predefined minimum quantity of filters in stock. Other components such as consumables (f.i. a deionization resin) and wear parts are managed in the same way, using signals provided by the control unit of the machine tool. In this way the warehouse is managed safely and efficiently.

For a safe estimation of the filter lifetime it is preferable to consider the real machining condition, including roughing, finishing, machining pauses, etc. The inventive method reflects the work currently processed by the machine by considering the actual evolution of the filter pressure including repeatedly sampling said filter pressure and by updating the calculated expected filter lifetime at each new sampling. A particular advantage of the inventive method is that there is no need to specifically model each machining condition (as described in the Background of the Invention). This is achieved by measuring and storing the filter pressure p(k) at sampling times t(k), with predetermined sampling intervals, setting a time window Tw to specify an observation period including a number of latest samplings, and, by regression analysis determining the time constant Tau and filter lifetime tf of the exponential function based on pressure values p(k) and sampling times t(k) within the specified time window Tw. Said exponential function shall fit with the measured pressure values p(k) and sampling times t(k).

In a preferred embodiment the determination of the parameters of the exponential function is done by the control unit by regression analysis and considering a certain time window Tw. This time window is set to specify a desired identification period, and comprises a plurality of latest pressure values logged. The pressure measurements p(k) and the respective sampling times t(k) in said time window Tw are used to determine the parameters of an exponential function which fits with the samplings in said time window Tw. The use of a time window Tw has the advantage that older measurements are not considered in the computation of the residual lifetime, also limiting the computing time. The time window is specified by the user, by a configuration parameter. The time window shall not be too short to avoid excessive variation of the computed filter lifetime. Typically, the time window is set in a range from 10 to 200 hours. A preferred time window could be 70 hours.

In another embodiment the entire filter history represented by the logged values is used to determine the parameters of the exponential function.

In a preferred embodiment the method for the determination of the filter lifetime is enhanced, in that the exponential function which best fits with the sampled pressure values p(k) and sampling times t(k) is made to match with the latest sampling point p(k),t(k). This is achieved by setting the error function to zero on said latest sampling point. By setting the error function •(k)=0 we force the exponential model to match with the latest sampling point p(k), t(k). In this way the updated computation reflects the latest condition of the filter.

The control unit stores the measured filter pressure values p(k) and the sampling time t(k).

The sampling interval between the measurements of the filter pressure is specified by the user as a configuration value. Typically, the sampling interval is in the range of a minute up to several tens of hours, preferably one to twenty hours. The sampling interval is not necessarily constant.

It is to be noted that the filter pressure may be continuously measured for monitoring purposes, for instance for the comparison with a threshold pressure.

As said the machining time measuring unit counts the machining time ts during which the electrical discharge machining process is running. The filters are used only during the effective machining time, thus the sampling of filter pressure is made only within the machining time ts. Machining time ts and sampling interval t(k+1)−t(k) are paused when the machining is stopped or paused. In any case, the identification is not disturbed by a variable sampling interval, especially during machining or when the machine is powered off, since the effective machining time ts is recorded.

In a preferred embodiment the inventive method for the determination of the filter lifetime comprises,
  once the filter pressure p(k) exceeds a predefined threshold pressure pn, repeatedly comparing the filter pressure p(k) at sampling time t(k) with at least one earlier filter pressure p(k−1) at sampling time t(k−1), and
  verifying if the currently measured filter pressure p(k) is considerably lower than at least one earlier filter pressure p(k−1).

As an example, the pressure threshold pressure pn may be for instance 2 bar; let us assume that a current filter pressure p(k) is 2.4 bar, that is pressure threshold pressure pn has been well exceeded. From now the newly measured current filter pressure p(k) is compared with at least one earlier filter pressure. The earlier filter pressure p(k−1) was 2.4 bar; the currently measured filter pressure p(k) is 0.3 bar thus one may derive that the filter is as good as new.

Considering that the earlier filter pressure p(k−1) was 2.4 bar (above the threshold pressure pn) and current pressure p(k) is 0.3 bar, the control unit derives that the filter has been replaced, and executes one or more of the following actions:
  releases a warning message for the user to inform that the machining time ts has not been reset, and/or;
  automatically resets the machining time ts.

In an alternative embodiment the inventive method for the determination of the filter lifetime comprises:
  a predefined pressure threshold pu1, by which the control unit determines if the latest earlier measured pressure p(k−1) was higher than said pressure threshold pu1, and
  a predefined lower pressure threshold pu2l and a predefined upper pressure threshold pu2u, by which the control unit determines if the currently measured filter pressure p(k) is within said lower and said upper pressure limits pu2l, pu2u.

As an example hereto, the pressure threshold pu1 may be for instance 2 bar; if the latest earlier measured pressure p(k−1) was above pu1, one derives that the filter was in the last quarter of filter lifetime. The lower pressure threshold pu2l may be for instance 0.25 bar and the upper pressure threshold pu2u may be for instance 0.35 bar, that is respectively 0.05 bar below and above of the initial value of the filter pressure pa of for instance 0.3 bar. If the currently measured filter pressure p(k) is within said lower pressure threshold pu2l and said upper pressure threshold pu2u, one derives that the filter is as good as new.

If both comparisons are true, then the control unit derives that the filter has been replaced. In this case the control unit executes one or more of the following actions:
  releases a warning message for the user to inform that the machining time ts has not been reset, and/or;
  automatically resets the machining time ts.

In a preferred embodiment the inventive method for the determination of the filter lifetime further comprises:
  a predefined pressure threshold pb1, by which the control unit determines if the latest earlier measured pressure p(k−1) was higher than said pressure threshold pb1, and
  a predefined pressure threshold pb2, by which the control unit determines if the currently measured filter pressure p(k) is below said pressure threshold pb2.

As an example, the pressure threshold pb1 may be for instance 2.6 bar; if the latest earlier measured pressure p(k−1) was above pb1, one derives that the filter was nearly exhausted.

The pressure threshold pb2 may be for instance 0.5 bar; if the currently measured filter pressure p(k) is below pb2, one derives that the filter pressure is below the expected value. If both comparisons are true, then the control unit derives that there is a problem with the filtration circuit, for example that the filter is broken or that the pressure sensor defective, etc.

Alternatively the control unit may derive a problem with the filtration circuit using only an adequately set pressure threshold pb3. If the currently measured filter pressure p(k) is below pressure threshold pb3, the control unit derives that the filter pressure is below the expected minimum filter pressure in the filtration circuit and that there is a problem with. In this case said pressure threshold pb3 is set below the initial filter pressure pa, for instance at 0.25 bar.

In the aforementioned cases where the control unit determines that there is a problem with the filtration circuit, the control unit executes one or more of the following actions:
  releases a warning message for the user signaling a problem with the filtration circuit (filter broken or pressure sensor defective, etc), and/or;
  pauses the machining process before starting a new pass, or inhibit the start of the machining process.

A control unit may further trigger any other desired action based on the detected event.

The computed residual filter lifetime is used to determine whether a machining job can be performed entirely without changing the filters. The user can select the actions to be taken by the control unit as a function of the residual filter lifetime, by setting the preferred behavior. The control unit may be configured:
  To release a warning message for the user to inform about the residual lifetime and/or the need to replace the filter, and/or;
  To pause the machining process before starting a new pass, or inhibit the start of the machining process if in consideration of the computed residual filter lifetime it is determined that the current machining cannot be completed safely with the current filter cartridges, and/or;
  when two or more pieces or machining are to be processed: to determine the suitable machining sequence of the main cuts and trim cuts, for instance avoiding all main cuts to be executed first (producing many debris, intense flushing), to complete at least one machining or pass.

The inventive method preferably uses the continuously updated history of filter pressure, considering a specified period of time, which is determined by the length of a time window Tw. Knowing that in continuous operation the pressure drop on the filter and flow rate through the filtration circuit follow an exponential law as a function of time, we identify the missing parameters of the exponential function over the specified identification time period, respectively time window Tw. The maximum allowable filter pressure pmax is a known parameter of the exponential function whereas the time constant Tau and the lifetime tf are to be determined. The parameters of the exponential function are determined by least squares regression analysis. The lifetime tf of the filters is directly determined, whereas the residual time to filter replacement tr, and the calendar deadline, i.e. date and time when the filters will have to be replaced are easily derived.

The exponential model may also be identified based on a calendar time ta (an absolute timescale) rather than the machining time ts. Thus the residual time to filter replacement tr, and the calendar deadline, i.e. date and time when the filters will have to be replaced can be computed by using said adapted algorithm which is referred to the calendar date and time.

BRIEF DESCRIPTION OF THE DRAWINGS

The invention will now be further described, by way of examples, and with reference to the accompanying drawings, in which.

DETAILED DESCRIPTION

An EDM machine needs a dielectric unit providing a sufficient quantity of conditioned dielectric fluid to perform the EDM process. An important function of said dielectric unit is the filtration of the dielectric fluid.

Figure 1:
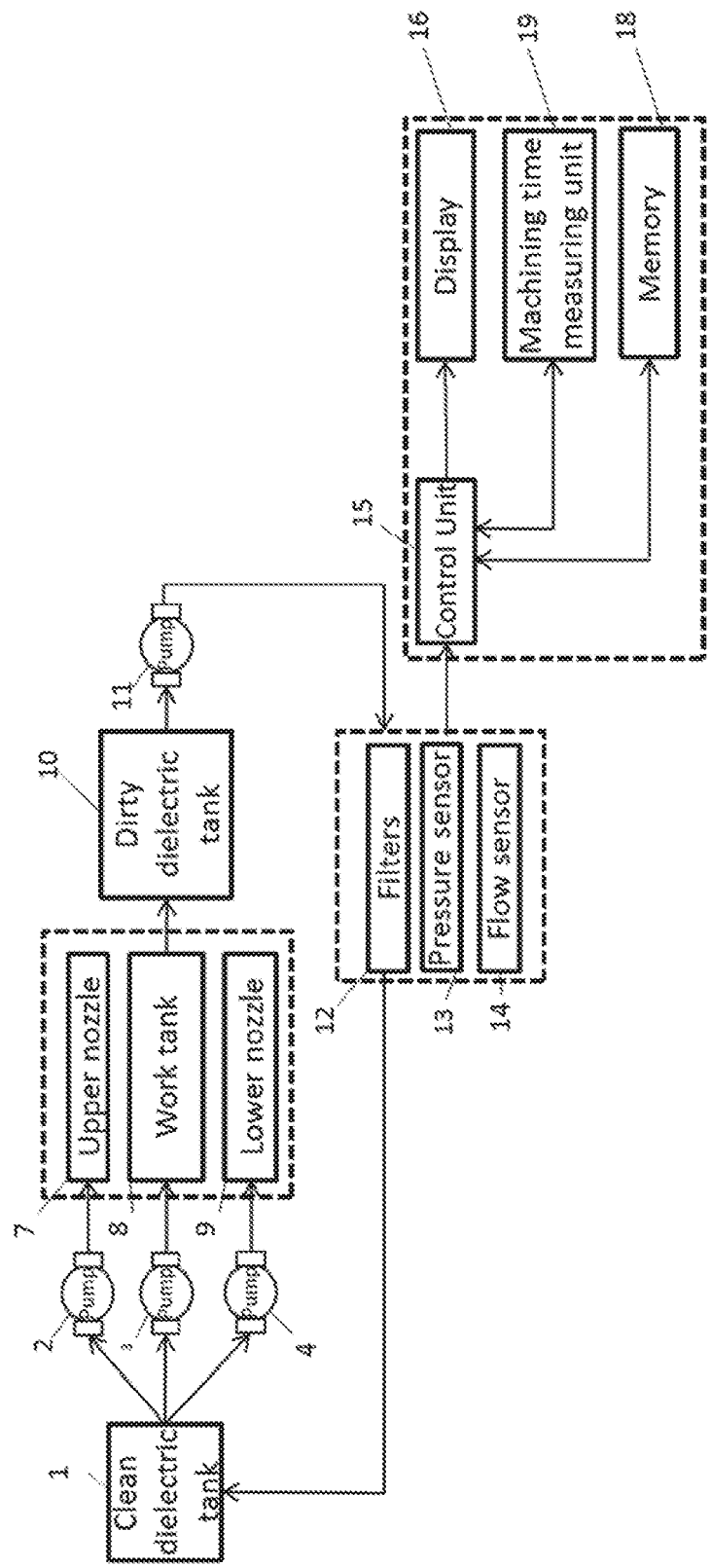
FIG. 1 is a block diagram showing a preferred embodiment of the present invention applied to a Wire EDM machine

FIG. 1. represents a block diagram of a typical wire electrical discharge machine (Wire EDM). The Wire EDM machine comprises a dielectric unit with a dirty dielectric tank 10 to collect the used dielectric fluid, a clean dielectric tank 1, to collect the conditioned dielectric fluid, and a filtration circuit. The pump 3 is used to fill the work tank 8 and to maintain a desired dielectric level in said work tank. In this representation pumps 2 and 4 are used to feed the dielectric fluid to the upper and the lower nozzle with high pressure. In practice (not shown) there may be one high pressure pump controlled by a frequency converter and then valves to control the dielectric fluid fed to the upper and the lower nozzle to flush the machining gap. The CNC, the axes control, and the EDM Generator (not shown) are used together to control the inter-electrode distance, that is the distance between the work piece and the wire electrode (both not shown), and to remove material according to a part program stored in the CNC. Due to the material removal occurring during the electrical discharge machining process, the dielectric is continuously charged with debris which are then retained by the filters.

The filtration circuit has an intake in the dirty dielectric tank 10, from which the dirty dielectric is fed by means of a filtration circuit pump 11 through one or more filters 12, whereby the particles are retained. The filters are cartridges which collect the particles and have a limited lifetime. The filtration circuit ends in the clean dielectric tank 1 where the clean dielectric is stored.

The filtration circuit further comprises a pressure sensor 13, and/or a flow rate sensor 14 which is arranged in series to the filter 12. The measurement provides information about the actual state of the filter 12, that is, its increasing hydraulic resistance due to the progressive occlusion.

The control unit 15 comprises or is connected with a machining time measuring unit 19 which counts the machining time ts during which the electrical discharge machining process is running. The control unit 15 stores the measured values in the memory 18 to keep a record of filter pressure values p(k) sampled during the machining process. The actual time t(k) of each sampling in the machining timescale ts will also be recorded in memory 18 by the control unit 15. The stored measurements constitute the history of the filter state. The memory 18 is reset at each replacement of the filters, either by the user or by the control unit. At the reset of the machining time ts=0 an initial value of tf=tfo is set, tfo representing a predefined overall filter lifetime. This value tfo is used to compute the residual time to filter replacement, until a predetermined transition pressure threshold pc is reached. When the filter pressure reaches the threshold pc, the filter lifetime tf is computed using the data stored in memory 18, the control unit 15 computes the filter lifetime tf, the residual time to filter replacement tr, and the calendar deadline of the estimated end of life of the filters 12. The control unit 15 displays these results on the display 16.

Figure 2A:
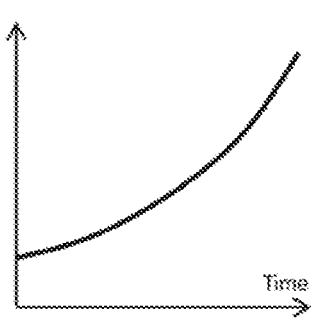
FIG. 2a is a typical graph representing the filter pressure over the time, when pressure is measured before the filters.

According to a preferred embodiment of the invention, a pressure sensor 13 is placed before the input of the filters 12, that is, at the filter entry side. Here the values measured by the pressure sensor increase progressively with the machining time due to the progressive obstruction of the filter and consequent increase of the hydraulic resistance. FIG. 2a is a qualitative representation of the filter pressure as a function of the time, for the above mentioned embodiment.

According to another embodiment the pressure drop, respectively the pressure differential of the pressure before and after the filter is measured by means of a differential pressure sensor, so that only the hydraulic resistance of the filter is observed. FIG. 2a applies also to this case.

Figure 2B:
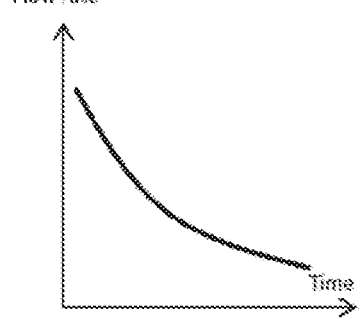
FIG. 2b is a typical graph representing the dielectric flow rate through the filtration circuit over the time.

According to a further embodiment, a flow rate sensor 14 is placed in the filtration circuit, preferably at the output of the filters 12. FIG. 2b is a qualitative representation of the flow rate across the filter as a function of the time.

Figure 3:
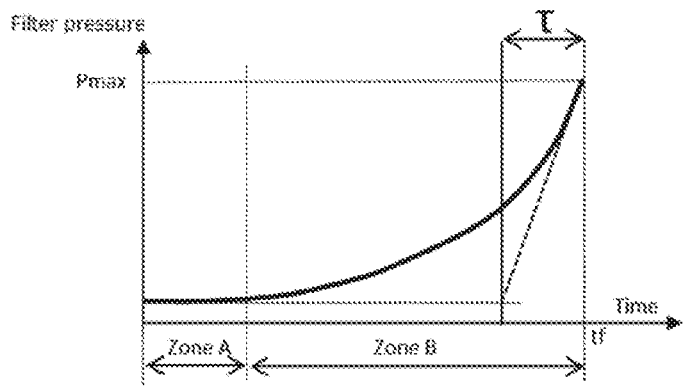
FIG. 3 is a typical graph representing the filter pressure as a function of the time, showing two behavioral zones.

FIG. 3 is a qualitative representation of the filter pressure as a function of the time. Here the pressure sensor is placed at the filter entry side; this is the typical case. The curve has a substantially monotonically increasing progression which is proportional to the progressive occlusion of the filter, however the curve shows two behavioral zones. The zone "B" corresponds to an exponential behavior, for the pressure as a function of the time. Zone "A" is a transition zone, where the filters are brand new. Here the filter pressure is nearly constant and a correlation with the soiling based on pressure samplings is not reliable.

Figure 5:
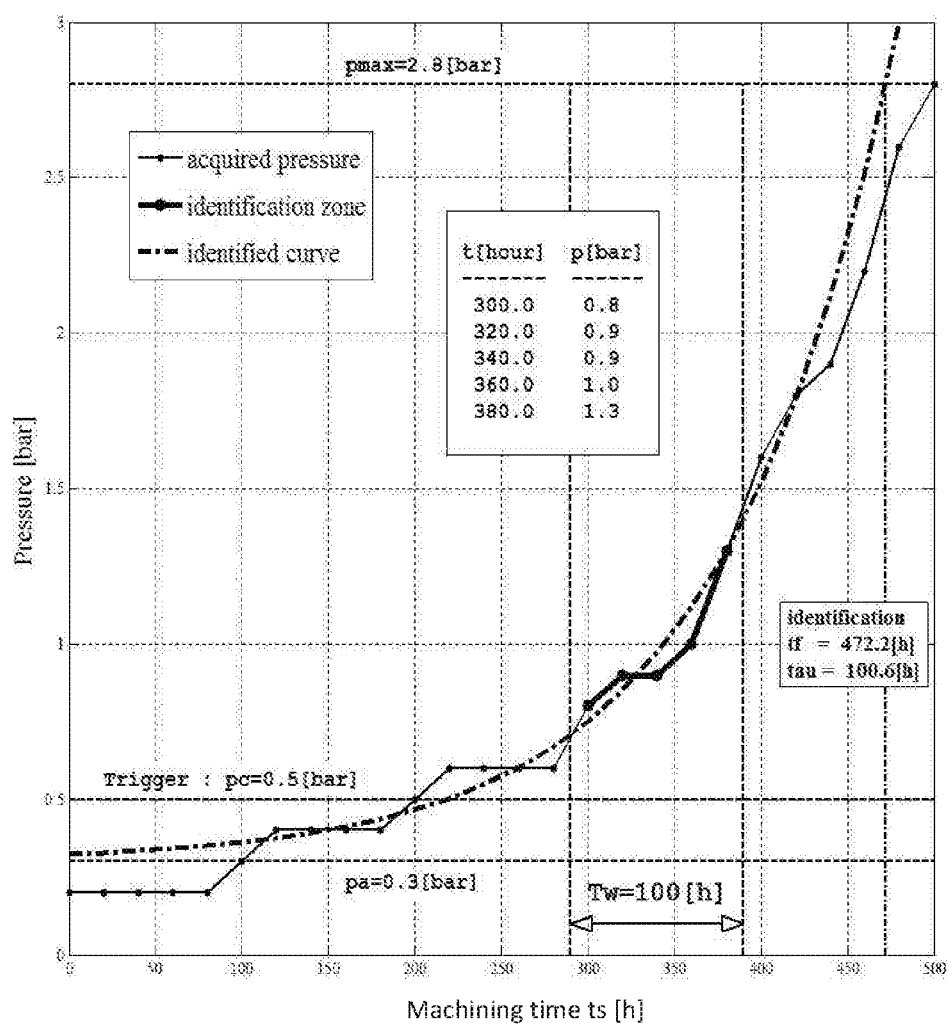
FIG. 5 is an example of pressure measurement, for which tf and tau are calculated. Then the identified pressure function is drawn, using the values of tf and tau.

According to a preferred embodiment of the invention, the computation of the filter lifetime and residual time to filter replacement is made by the control unit 15, using different rules for the two zones. In zone "B" a fitting to an exponential function will determine both, a time constant tau and a filter lifetime tf, as shown in FIG. 3. This filter lifetime tf is defined as the time where the filter pressure reaches the maximum allowable filter pressure pmax (see FIG. 3). It is to be noted that t=0 on filter replacement, and t=tf when pressure reaches pmax (end of life). In zone "A", which is a transition zone, the filter pressure is not relevant for the computation of the filter lifetime tf, respectively the residual filter lifetime tr; however the filter pressure is measured also in zone "A" in view of the computation made in zone B which is based on historical samplings. In zone "A" tf cannot be computed reliably based on the filter pressure value history, but is computed based for instance on the effective lifetime of the previous filters mounted on the machine (using the predefined overall filter lifetime tfo) and by down-counting the machining hours. The switch from the method applicable to zone "A", to the method applicable to zone "B" is made when the filter pressure reaches a transition pressure threshold pc, for instance 0.5 bar (50 kPa) as shown in FIG. 5.

Figure 4:
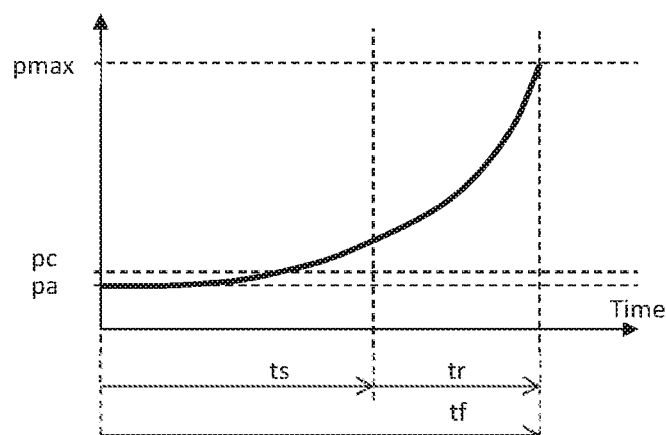
FIG. 4 is a typical graph representing the filter pressure as a function of the time, showing the machining time, the filter lifetime, the residual time to filter replacement and the calendar deadline.
Figure 4:
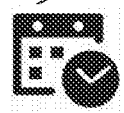

FIG. 4 displays a graph representing the filter pressure as a function of the time. As mentioned the curve is an exponential. The initial filter pressure pa in the filter circuit is the filter pressure with new filters. This initial filter pressure pa corresponds essentially to the asymptotic of the exponential function. The measured initial filter pressure is not significantly higher than said asymptotic; within the present invention we will consider the two as equivalent. Here the timescale used in the invention is shown with: the filter lifetime tf, the machining time ts, the residual time to filter replacement tr, and the calendar deadline.

The following example refers to the case in which the filter pressure measured ahead of the filters in flow direction is used as the significant physical value. As mentioned the filter pressure rises essentially according to an exponential law, as follows:

$$p(k)=pa+(pmax-pa)*\exp((t(k)-tf+\varepsilon(k)/tau),$$

where:
- k is a sampling index and applies to the recorded pressure p and time t;
- t(k) is the sampling time of a sample k over the machining time, such as t=0 at filter replacement. t(k) is expressed in seconds;
- p(k) is the measured filter pressure at sampling time t(k). p(k) is expressed in Pascal;
- pa is a constant which corresponds essentially to the asymptotic of the exponential function; said asymptotic is nearly equivalent to the initial filter pressure in the filter circuit, when new filters are inserted. pa is expressed in Pascal;
- pmax is the maximal allowed filter pressure. pmax is expressed in Pascal;
- tf is an output of the algorithm, representing the filter lifetime, that is the time during which the filter is expected to be serviceable. In other words, if the identification algorithm was perfect, the time tf would be given at the same value, from the filter replacement, until the end of filter life. At this precise time t, the machining time is would be equal to tf. tf is expressed in seconds;
- tau is another output of the algorithm. tau is expressed in seconds;
- $\varepsilon$ is an error function. $\varepsilon(k)$ is its value at sampling time t(k). The goal is to minimize the least squares value of $\varepsilon$ in a specific range. $\varepsilon$ is expressed in seconds.

Preferably, tf and tau are recalculated at each new sampling, so that the latest measured pressure value is considered. tf and tau are calculated such that:
- $\varepsilon(k_2)=0$, for $k_2$ being the index of last acquired point;
- the RMS value of $\varepsilon$, on the specific range $[k_1 \ldots k_2]$, being the smallest possible, with $k_1$ such as $ts(k_2)-ts(k_1)$ is nearly equal to Tw, ts being the machining time, and Tw being the considered time window.

The residual time to filter replacement tr before filter depletion is expressed as: tr=tf−t In the above description, the time t can either represent machining time ts, or calendar time ta. Depending on the two time representation, one can compute tf and tau either in a machining timescale, or in a calendar timescale.

To determine tf and tau, we use the sampling period from $k=k_1$ to $k=k_2$:

$$p(k_1) = pa + (pmax - pa)*\exp((t(k_1) - tf + \varepsilon(k_1))/tau),$$
$$p(k_1 + 1) = pa + (pmax - pa)*\exp((t(k_1 + 1) - tf + \varepsilon(k_1 + 1))/tau),$$
$$\ldots$$
$$p(k_2 - 1) = pa + (pmax - pa)*\exp((t(k_2 - 1) - tf + \varepsilon(k_2 - 1))/tau),$$
$$p(k_2) = pa + (pmax - pa)*\exp((t(k_2) - tf + \varepsilon(k_2))/tau),$$

As we want the calculation of $p(k_2)$ to be exact at the filter end of life, one finds $\varepsilon(k_2)=0$ in this case. Using this criterion, even before the filter end of life, one can find tau as follows:

$$tau=(t(k_2)-tf)/\ln((p(k_2)-pa)/(pmax-pa)).$$

Then the error function becomes for $k<k_2$:

$$\varepsilon(k)=(q(k_2)-q(k))*tf-t(k)*q(k_2)+t(k_2)*q(k),$$

with $q(k)=\ln((p(k)-pa)/(pmax-pa))$.

Minimizing the RMS value of $\varepsilon$ in range $k_1 \ldots k_2-1$, means to solve $d/dtf\{\Sigma[(\varepsilon(k))^2]\}=0$.

One can solve it and find tf:

$$tf=num/den,$$

with $$num=\Sigma[(q(k_2)-q(k))*(q(k_2)*t(k)-q(k)*t(k_2))], k=k_1 \ldots k_2-1$$

$$den=\Sigma[(q(k_2)-q(k))^2], k=k_1 \ldots k_2-1$$

For tau computation, remember that:

$$tau=(t(k_2)-tf)/\ln((p(k_2)-pa)/(pmax-pa)).$$

FIG. 5 illustrates a numerical example, with the time window Tw=100 h considered for the determination of the parameters of the exponential function, a sampling interval of 20 h, providing 5 samplings, and an initial filter pressure in the filter circuit of pa=0.3 bar (30 kPa):
The following table shows the filter pressure values which have been measured at a certain machining time ts:
ts [h] 300 320 340 360 380
p [bar] 0.8 0.9 0.9 1.0 1.3
The parameters of the exponential function are thus determined by using the above formulas:
tf=472.2 h; tau=100.6 h The invention uses the pressure p(k) measured at sampling times t(k) to determine the parameters of an exponential function which best fits with the pressure samplings, where said parameter comprise the filter lifetime which will be achieved at a given maximum filter pressure based on current samplings. It goes without saying that, instead of the filter pressure, one could sample another value reflecting the filter status to determine the parameters of an exponential function and lastly to determine the filter lifetime and the residual filter lifetime to filter replacement. This may be for instance a filter flow rate or the level of the dielectric in the clean tank. The measuring methods may also be used together.

As illustrated in FIG. 5 a transition pressure threshold (a trigger level) is set at 0.5 bar. In this example the filter pressure of 0.5 bar is reached after 200 machining hours. During the first 200 h the filter lifetime is determined by the predefined overall filter lifetime tfo. Thus the first rule, i.e. the down-counting method is used during about ⅖ of the entire filter lifetime. The second rule, i.e. the determination of the exponential function fitting the sampled pressure measurements is used during about ⅗ of the entire filter lifetime. The filter pressure is sampled during the entire machining time, i.e. also during the initial phase, to get the required sampling points for the regression analysis.

As shown in the diagram the pressure samplings of the first 80 h are constant, thus the transition pressure threshold pc of 0.5 bar and the time window Tw of 100 h are appropriately set.

The invention has been described here above referring to a wire EDM however the same method is applicable to other manufacturing machines and processes such as die sinking EDM, EDM drilling, EDM milling, EDM grinding, etc., but also to other processes in which such cartridge filters are used.

It goes without saying that the method according the invention can be adopted with an arbitrary number of filter cartridges, whereas the filters can be machine specific or shared with other machines of a workshop.

REFERENCE LIST 1 clean dielectric tank
2,3,4 pumps
7,9 Upper-/lower nozzle
8 work tank
10 dirty dielectric tank
11 filtration circuit pump
12 Filter(s)
13 pressure sensor
14 flow rate sensor
15 control unit
16 display unit
18 memory
19 machining time measuring unit

The invention claimed is:
1. A method for determining a lifetime of a filter of an electrical discharge machine, the method comprising:
   a) storing a maximum allowable filter pressure in a memory unit of a control unit;
   b) counting with a machining time measuring unit a machining time during which an electrical discharge machining process of the electrical discharge machine is running;
   c) during the machining time, repeatedly measuring a filter pressure with a filter pressure sensor at sampling times spaced apart at predetermined sampling intervals;
   d) storing in the memory unit the measured filter pressures and the sampling times; and
   e) determining by regression analysis with the control unit, the parameters of an exponential function, being a time constant and the lifetime of the filter, which best fits to the measured filter pressures and the sampling times;
   f) wherein the control unit is configured to use the determined lifetime of the filter by regression analysis only after the measured filter pressure reaches a predefined transition pressure threshold, and based on the determined lifetime of the filter the control unit is configured to one or more of release a warning message for a user, pause or inhibit start of the machining process, or alter a machining sequence.

2. The method of claim 1, wherein the exponential function matches with a latest sampling point of the measured filter pressures and the sampling times by setting an error function to zero.

3. The method of claim 1, further comprising computing with the control unit a residual time to filter replacement by subtracting the machining time from the calculated filter lifetime.

4. The method of claim 3, further comprising computing with the control unit a calendar deadline by adding the residual time to filter replacement to a current date and time.

5. The method of claim 1, further comprising setting with the control unit a time window to specify a desired identification period of the measured filter pressures and the sampling times and that the measured filter pressures and the sampling times in said time window are used to determine the parameters of the exponential function.

6. The method of claim 1, wherein after a replacement of the filter the machining time is reset by the user or automatically reset by the control unit.

7. The method of claim 1, further comprising:
   after the measured filter pressure exceeds a predefined threshold pressure, repeatedly comparing, with the control unit, the filter pressure currently measured at the sampling time with at least an earlier measured filter pressure sampled at an earlier sampling time;
   if the filter pressure currently measured at the sampling time is lower than at least one earlier measured filter pressure, the control unit executes one or more of the following actions:
   release a warning message for the user to inform that the machining time has not been reset; and
   automatically reset the machining time.

8. The method of claim 1, wherein,
   if an earlier measured filter pressure sampled at an earlier sampling time is higher than a predefined threshold, and
   if the filter pressure currently measured is above a lower pressure threshold that is lower than an initial value of the filter pressure, and
   if the filter pressure currently measured is below an upper pressure threshold that is higher than the initial value of the filter pressure, then the control unit is configured to execute at least one of the following actions:
   release a warning message for the user to inform that the machining time has not been reset; and
   automatically reset the machining time.

9. The method of claim 1, wherein,
if an earlier measured filter pressure sampled at an earlier sampling time is higher than a predefined value, and
if the filter pressure currently measured is below a predefined value, then the control unit is configured to execute at least one of the following actions:
release a warning message for the user signaling a problem with the filtration circuit; and
pause the machining process before starting a new pass, or inhibit start of the machining process.

10. The method of claim 1, wherein after replacement of the filter the lifetime of the filter is set by the control unit at a value of a predefined overall filter lifetime, and the set value for the filter lifetime is maintained by the control unit until a transition pressure threshold is reached, and thereafter the control unit determines the filter lifetime based on the measured filter pressures and the sampling times.

11. The method of claim 1, further comprising displaying the filter lifetime, and/or a residual time to filter replacement, and/or a calendar deadline on a display of the electrical discharge machine.

12. The method of claim 1, further comprising determining with the control unit a machining duration of a machining and/or machining of a current workpiece, and comparing with the control unit the residual time to filter replacement with said machining duration, and that, when the control unit determines that the machining duration exceeds the residual time to filter replacement the control unit executes at least one of the following actions:
release the warning message for the user to inform about the residual lifetime and/or the need to replace the filter;
pause the machining process before starting a new pass, or inhibit the start of the machining process; and
determine a machining sequence of main cuts and trim cuts, to complete at least one machining or pass.

13. A method for determining a lifetime of a filter of an electrical discharge machine, the method comprising:
a) storing a maximum allowable filter pressure in a memory unit of a control unit;
b) storing in the memory of the control unit an initial calendar date and time at a replacement of the filter;
c) repeatedly measuring a filter pressure with a filter pressure sensor at sampling times spaced apart at predetermined sampling intervals;
d) storing in the memory unit the measured filter pressures and the sampling times;
e) determining by regression analysis with the control unit, the parameters of an exponential function, being a time constant and the lifetime of the filter, which best fits to the measured filter pressures and the sampling times;
f) computing with the control unit a calendar deadline corresponding to an expected filter expiration date and time by adding the lifetime of the filter to the initial calendar date and time;
wherein the control unit is configured to use the determined lifetime of the filter by regression analysis only after the measured filter pressure reaches a predefined transition pressure threshold, and based on the determined lifetime of the filter the control unit is configured to one or more of release a warning message for a user, pause or inhibit start of the machining process, or alter a machining sequence.

14. The method of claim 13, further comprising:
a) storing in the memory unit the initial calendar date and time at replacement of the filter and
b) computing with the control unit the calendar deadline corresponding to the expected filter expiration date and time by adding the calendar filter lifetime to the initial calendar date and time.

15. An electrical discharge machine for an electrical discharge machining process, the electrical discharge machine comprising:
a control unit including a machining time measuring unit and a memory unit, the machining time measuring unit counts a machining time during which the electrical discharge machining process produces debris;
a dielectric unit for the conditioning of a dielectric fluid, the dielectric unit including a filtration circuit with one or more filters to filter the debris produced by the electrical discharge machining process;
a filter pressure sensor located in the filtration circuit through which the dielectric fluid is supplied to the filter and configured to measure a filter pressure during the machining time;
wherein the control unit is configured to sample the filter pressure by way of said filter pressure sensor;
wherein the memory unit is configured to store the machining time determined by the machining time measuring unit and the filter pressure determined by the filter pressure sensor;
wherein the control unit is configured to calculate by regression analysis a filter lifetime based on the machining time and the filter pressure stored in the memory unit and a maximum allowable filter pressure;
wherein the control unit is configured to use the filter lifetime, which has been calculated by regression analysis, only after the filter pressure reaches a predefined transition pressure threshold; and
wherein a display unit is configured to display the calculated filter lifetime, and based on the determined lifetime of the filter the control unit is configured to one or more of display the determined lifetime of the filter to a user by way of the display unit, pause or inhibit start of the machining process, or alter a machining sequence.

* * * * *